(12) United States Patent
Wong (10) Patent No.: US 7,586,521 B2
(45) Date of Patent: Sep. 8, 2009

(54) AUTOMATIC COLOR CALIBRATION OF AN IMAGE SENSOR

(75) Inventor: Ping Wah Wong, Sunnyvale, CA (US)

(73) Assignee: Nethra Imaging Inc., Santa Clara ( * ) Notice: Subject to any disclaimer, the term of this patent is extended or adjusted under 35 U.S.C. 154(b) by 581 days.

(21) Appl. No.: 11/341,323

(22) Filed: Jan. 27, 2006

(65) Prior Publication Data

US 2007/0177032 A1    Aug. 2, 2007

(51) Int. Cl.
*H04N 5/228* (2006.01)

(52) U.S. Cl. .................... 348/222.1; 348/188; 358/518

(58) Field of Classification Search ............... 348/129, 348/187, 188, 222.1, 254, 272, 223.1, 207.99; 358/516, 518–521, 1.8, 1.9; 382/254; 396/2
See application file for complete search history.

(56) References Cited

U.S. PATENT DOCUMENTS 5,589,954  A  * 12/1996 Watanabe .................. 358/518
6,362,849  B1 *  3/2002 Caisey-Bluteau et al. 348/222.1
2001/0045980  A1 * 11/2001 Leonard ..................... 348/129
2001/0046381  A1 * 11/2001 Ichikawa et al. ............... 396/2
2004/0091164  A1 *  5/2004 Sakatani et al. ............. 382/254
2004/0246352  A1 * 12/2004 Suzuki ....................... 348/272
2005/0073703  A1 *  4/2005 Nakane ....................... 358/1.9

* cited by examiner

*Primary Examiner*—Lin Ye
*Assistant Examiner*—Dennis Hogue
(74) *Attorney, Agent, or Firm*—Hahn and Moodley LLP; Vani Moodley (57) ABSTRACT

In one embodiment of the invention, a method is provided. The method, comprises (a) determining a white balance correction parameter for a white balance correction processing block for an image sensor, and including the white balance correction parameter in the white balance correction processing block; (b) determining a gamma correction parameter for a gamma correction processing block for the image sensor, and including the gamma correction parameter in the gamma correction processing block; and (c) determining a color correction parameter for a color correction processing block for the image sensor, and including the color correction parameter in the color correction processing block.

19 Claims, 3 Drawing Sheets

AUTOMATIC COLOR CALIBRATION OF AN IMAGE SENSOR

FIELD

Embodiments of the invention relates to an image capturing device. In particular, embodiments of the invention relate to determining color correction parameters for use by a color correction system for an image capturing device.

BACKGROUND

In digital color image capturing devices, or systems, such as, for example, digital cameras, digital endoscopes, and the like, a scene is typically captured by an image sensor, such as, for example, a Charge Coupled Device (CCD), a CMOS sensor, or the like. The scene captured by the image sensor is converted into image data by the image sensor. The image data is in the form of pixel values corresponding to the image. The image data is then processed through an imaging pipeline by making use of, for example, appropriate algorithms, or the like, so as to produce an output color image. A reason for processing the image data through the imaging pipeline is to produce an accurate color output image from the image capturing device, or system, at a specified output resolution.

Typically, the output color image has three primary color values per pixel. A typical color image is defined by three primary color planes of pixels, where each pixel is typically defined by a 3-tuple in a color space, such as, for example, the Red, Green and Blue (RGB) color space. Although RGB is one of the most common color spaces currently in use, there are many other color spaces. Some examples of such other color spaces include the CMY (Cyan, Magenta and Yellow), the YUV (where Y is the luminance and U and V represent chrominance), and the HSL (Hue, Saturation, and Lightness) color spaces.

Color accuracy, namely whether the color in the scene is accurately described by the output color image, is an important consideration in providing color image output quality. Color accuracy of an image capturing device, or system, may be influenced by, for example, the physical characteristics of the capturing device, the lighting condition in the scene during image capture, etc.

To produce an accurate color output image, it is important to compensate for distortion caused by the physical characteristics of the image capturing device. It is also important to compensate for distortion which can be caused when different lighting conditions, such as daylight, artificial lighting, are present in the scene. Such compensation may be provided by means of a color correction system of the image capturing device. For such a color correction system to perform properly, it is necessary to calibrate the color correction system. Calibration of the color correction system involves determining appropriate color compensation parameters. Once appropriate compensation parameters have been determined, the compensation parameters can be employed by the color compensation system to enable the image capturing device to produce relatively accurate color output images.

Appropriate compensation parameters can include gamma curves, color channel gains and offsets, color correction parameters, and the like.

SUMMARY

According to a first aspect of the invention, there is provided a method comprising (a) determining a white balance correction parameter for a white balance correction processing block for an image sensor, and including the white balance correction parameter in the white balance correction processing block; (b) determining a gamma correction parameter for a gamma correction processing block for the image sensor, and including the gamma correction parameter in the gamma correction processing block; and (c) determining a color correction parameter for a color correction processing block for the image sensor, and including the color correction parameter in the color correction processing block.

According to a second aspect of the invention, there is provided a method, comprising (a) disabling a gamma correction function, a gain correction function, an offset correction function, and a color correction function for a sensor; (b) capturing a first image of a color test chart with the sensor, wherein a pixel value corresponding to each color patch of the color test chart is known; (c) determining a first measured pixel value for each color patch in the first image; (d) determining gamma correction parameters for the sensor based on differences between each first measured pixel value for a color patch and the known pixel value for that color patch; (e) enabling the gamma correction function for the sensor using the gamma correction parameters determined in step (d); (f) with the gamma correction function enabled, capturing a second image of the color test chart with the sensor, and determining a second measured pixel value for each color patch in the second image; (g) determining gain and offset parameters for the gain and offset corrections, respectively based on differences between each second measured pixel value for a color patch and the known pixel value for that color patch; (h) enabling the gain correction function and the offset correction function for the sensor, wherein for the gain correction function the channel gain parameters determined in step (g) are used, and for the offset correction function the offset parameters determined in step (g) are used; (i) capturing a third image of the color test chart with the sensor and with the gamma correction function, the gain correction function, and the offset correction function enabled; (j) determining a third measured pixel value for each color patch in the third image; and (k) determining color correction parameters for the color correction function based on differences between each third measured pixel value for a color patch and the known pixel value for that color patch.

According to a third aspect of the invention, there is provided a computer-readable medium having stored thereon, a sequence of instructions which when executed by a processor, cause the processor to perform a method comprising (a) disabling a gamma correction function, a gain correction function, an offset correction function, and a color correction function for a sensor; (b) capturing a first image of a color test chart with the sensor, wherein a pixel value corresponding to each color patch of the color test chart is known; (c) determining a first measured pixel value for each color patch in the first image; (d) determining gamma correction parameters for the sensor based on differences between each first measured pixel value for a color patch and the known pixel value for that color patch; (e) enabling the gamma correction function for the sensor using the gamma correction parameters determined in step (d); (f) with the gamma correction function enabled, capturing a second image of the color test chart with the sensor, and determining a second measured pixel value for each color patch in the second image; (g) determining gain and offset parameters for the gain and offset corrections, respectively based on differences between each second measured pixel value for a color patch and the known pixel value for that color patch; (h) enabling the gain correction function and the offset correction function for the sensor, wherein for the gain correction function the channel gain parameters determined in step (g) are used, and for the offset correction function the offset parameters determined in step (g) are used; (i) capturing a third image of the color test chart with the sensor and with the gamma correction function, the gain correction function, and the offset correction function enabled; (j) determining a third measured pixel value for each color patch in the third image; and (k) determining color correction parameters for the color correction function based on differences between each third measured pixel value for a color patch and the known pixel value for that color patch.

According to a fourth aspect of the invention, there is provided a system, comprising a processor; and a memory coupled to the processor, the memory storing instructions which when executed by the processor, cause the processor to perform a method comprising (a) disabling a gamma correction function, a gain correction function, an offset correction function, and a color correction function for a sensor; (b) capturing a first image of a color test chart with the sensor, wherein a pixel value corresponding to each color patch of the color test chart is known; (c) determining a first measured pixel value for each color patch in the first image; (d) determining gamma correction parameters for the sensor based on differences between each first measured pixel value for a color patch and the known pixel value for that color patch; (e) enabling the gamma correction function for the sensor using the gamma correction parameters determined in step (d); (f) with the gamma correction function enabled, capturing a second image of the color test chart with the sensor, and determining a second measured pixel value for each color patch in the second image; (g) determining gain and offset parameters for the gain and offset corrections, respectively based on differences between each second measured pixel value for a color patch and the known pixel value for that color patch; (h) enabling the gain correction function and the offset correction function for the sensor, wherein for the gain correction function the channel gain parameters determined in step (g) are used, and for the offset correction function the offset parameters determined in step (g) are used; (i) capturing a third image of the color test chart with the sensor and with the gamma correction function, the gain correction function, and the offset correction function enabled; (j) determining a third measured pixel value for each color patch in the third image; and (k) determining color correction parameters for the color correction function based on differences between each third measured pixel value for a color patch and the known pixel value for that color patch.

Other aspects of the invention will be apparent from the detailed description below.

BRIEF DESCRIPTION OF THE DRAWINGS

Embodiments of the invention will now be described, by way of example, with reference to the accompanying diagrammatic drawings, in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown at block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
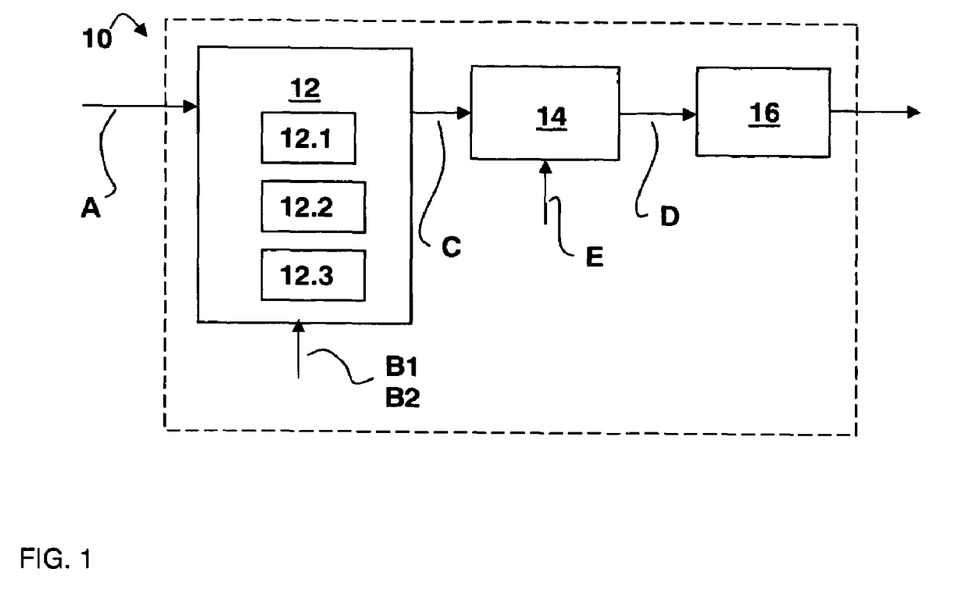
FIG. 1 shows a schematic block diagram indicating a color correction system of an image capturing device.

Referring to FIG. 1 of the drawings, an example of a color correction system of an image capturing device is schematically and generally indicated by reference numeral 10. The color correction system 10 includes a front-end image processing block 12, a color correction block 14, and a back-end image processing block 16. In this example, the front-end processing block includes a demosaicing step 12.1, a channel gain and offset step 12.2, and a gamma correction step 12.3. Generally the front-end processing block can include other additional steps.

The front-end image processing block 12 receives captured color image data, or raw sensor data, from a sensor, such as a Charge Coupled Device (CCD), or CMOS sensor, or the like, as indicated by arrow A. The front-end image processing block 12 typically performs a demosaicing procedure 12.1 on the received data so that each pixel is defined by three primary colors in a color space, such as, for example, RGB (Red, Green, Blue), or the like.

The front-end image processing block 12 performs a color channel gain and offset step 12.2 with color gain and offset parameters B1 and a gamma correction step 12.3 with gamma correction parameters B2, on the data. The color gain and offset step 12.2 modifies the gain and offset in each individual channel so as to enhance white balance, namely, to cause white color in the scene to be rendered as white color in a color output image. The gamma correction step 12.3 compensates for non-linearity in light to electron transfer by the sensor. After the color gain and offset step 12.2 and the gamma correction step 12.3, pixel data are typically output as indicated by arrow C. The pixel data output at C can be defined as $(r'_{m,n}, g'_{m,n}, b'_{m,n})$, where $r'_{m,n}, g'_{m,n}$ and $b'_{m,n}$ are the respective red, green and blue pixel values at a coordinate (m, n).

Since the physical characteristics of the image capturing device, as well as the fact that the lighting condition in the scene can typically vary, for example, the lighting may be natural, or artificial, the values $(r'_{m,n}, g'_{m,n}, b'_{m,n})$ output at C may not represent true reflection of the actual color in the scene. It can therefore be necessary for color correction, as indicated by the block 14, so as to transform the pixel values $(r'_{m,n}, g'_{m,n}, b'_{m,n})$ into output pixel values $(r_{m,n}, g_{m,n}, b_{m,n})$, as indicated by the arrow D, that more accurately reflect the actual color in the scene. Color correction at 14 is typically performed using color compensation parameters as indicated by arrow E.

An example of equations that may be used by the front-end image processing block 12 to modify the input data A so as to compensate for gain, offset and gamma correction γ( ), are as follows:

$$r'_{m,n} = \gamma(\lambda_r \tilde{r}_{m,n} + \rho_r)$$
$$g'_{m,n} = \gamma(\lambda_g \tilde{g}_{m,n} + \rho_g) \qquad (1)$$
$$b'_{m,n} = \gamma(\lambda_b \tilde{b}_{m,n} + \rho_b)$$

where the parameters $\lambda_r$, $\rho_r$, $\lambda_g$, $\rho_g$, $\lambda_b$ and $\rho_b$ represent the color gains and offsets in each channel (RGB, for example), γ( ) represents gamma correction, and $\tilde{r}_{m,n}$, $\tilde{g}_{m,n}$, $\tilde{b}_{m,n}$ represent the captured color image data at A.

Figure 2:
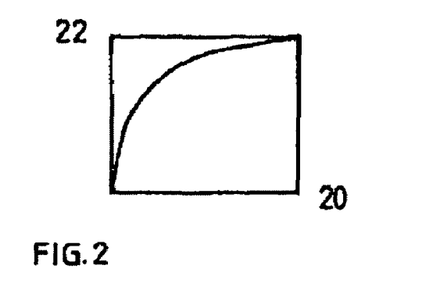
FIG. 2 shows an example of a gamma response curve used in a color correction system of an image capturing device.

The gamma correction γ( ) can typically be represented by a non-linear curve as shown in FIG. 2 of the drawings, where the input is shown at 20 and the output is shown at 22.

The color correction block 14 may include a mapping between input and output color vectors. Such a mapping may be performed by, for example, matrix multiplication, or non-linear mathematical mapping, or using table look up approaches, or the like. The mapping can be performed in RGB or any other appropriate color spaces, such as L*a*b*, for example.

For example, color correction can be performed by using a 3×3 matrix, as follows:

$$\begin{pmatrix} r_{m,n} \\ g_{m,n} \\ b_{m,n} \end{pmatrix} = \begin{pmatrix} a_{0,0} & a_{0,1} & a_{0,2} \\ a_{1,0} & a_{1,1} & a_{1,2} \\ a_{2,0} & a_{2,1} & a_{2,2} \end{pmatrix} \begin{pmatrix} r'_{m,n} \\ g'_{m,n} \\ b'_{m,n} \end{pmatrix}. \qquad (2)$$

Instead, for example, color correction may be performed by using difference values of the color channels, as follows:

$$\begin{pmatrix} r_{m,n} \\ g_{m,n} \\ b_{m,n} \end{pmatrix} = \begin{pmatrix} r'_{m,n} \\ g'_{m,n} \\ b'_{m,n} \end{pmatrix} + \begin{pmatrix} d_{0,0} & d_{0,1} & \cdots & d_{0,K-1} \\ \vdots & & & \vdots \\ d_{2,0} & d_{2,1} & \cdots & d_{2,K-1} \end{pmatrix} \begin{pmatrix} f_0(r'_{m,n}, g'_{m,n}, b'_{m,n}) \\ f_1(r'_{m,n}, g'_{m,n}, b'_{m,n}) \\ \vdots \\ f_{K-1}(r'_{m,n}, g'_{m,n}, b'_{m,n}) \end{pmatrix} \qquad (3)$$

where $f_i(\ )$'s are typically functions of the RGB values at pixel location (m, n).

The color compensation parameters $a_{i,j}$'s or $d_{i,j}$'s in the equations (2) and (3) typically vary with the physical characteristics of the image capturing device and the lighting condition in the scene. However, they typically do not change from one pixel to the next. For an image capturing device with a given sensor, a plurality of sets of color correction parameters can be stored for use in different types of lighting condition. For example, one set of parameters can be stored for a daylight lighting condition, one set of parameters can be stored for a tungsten light lighting condition, one set of parameters can be stored for a fluorescent light lighting condition, and the like. During actual image capture, an appropriate set of color correction parameters corresponding to the type of lighting condition in the scene is typically selected, as indicated by arrow E in FIG. 1 of the drawings.

Determining the gamma, the gain, the offset, and the color correction parameters can be problematic. It is possible to set up the image capturing device by manually adjusting the various parameters through trial and error in various lighting conditions, until the output colors are satisfactory. However, such a procedure is impractical for a number of reasons. Firstly, accurate color correction is typically determined by a combination of all the parameters. Adjustment of a parameter on its own typically cannot compensate for the color characteristics of the image capturing device properly. Accordingly, adjustment of each parameter individually typically can only bring the color response of the system to an intermediate state. Therefore, if the parameters are adjusted one by one, it is typically not possible to determine if the value for each particular parameter is at an optimum. Secondly, the parameters are not independent of one another. Accordingly, changing one parameter can alter the effect of the others. It is therefore not possible to anticipate what effect other parameters will have on the system when changing any particular parameter. Thirdly, each parameter can be quantized so that each parameter can take on one of L possible discrete values and then a search can be performed over the discrete space of the parameters to find optimum values. However, the size of such a discrete space grows exponentially with the number of parameters. Accordingly, an exhaustive search is normally unfeasible even for a relative small value of L, such as 32, for example. L=32 is typically not a fine enough amount of quantization for the parameters.

An embodiment of a method of determining color compensation parameters for a color image capturing device, in accordance with the invention, will now be described with reference to FIGS. 3 and 4 of the drawings.

Figure 3:
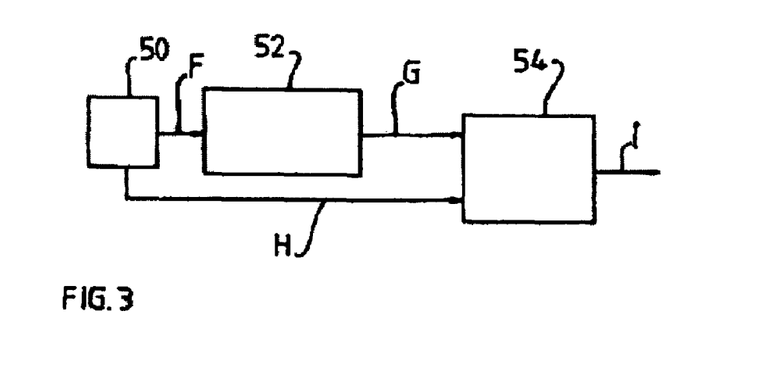
FIG. 3 shows a schematic block diagram indicating a method of calibrating a color correction system of an image capturing device, in accordance with an embodiment of the invention.
Figure 4:
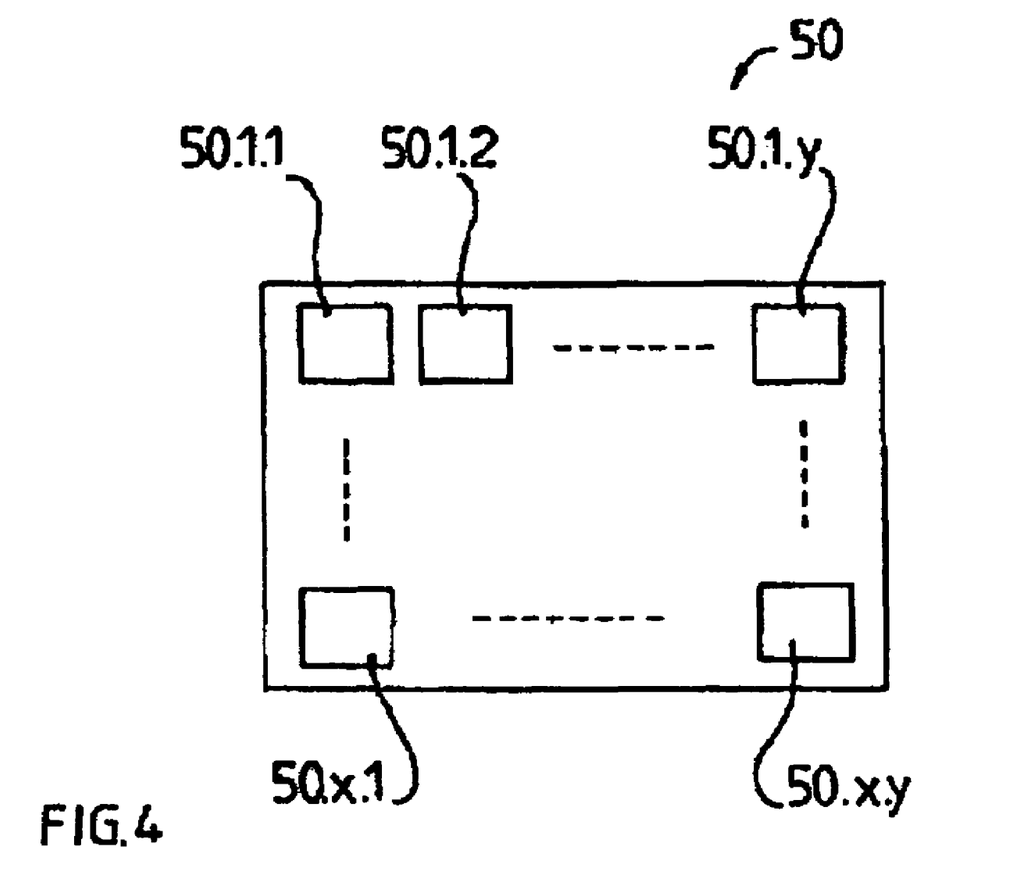
FIG. 4 shows a color test chart containing an array of color patches, the color values of which patches are known.

In accordance with such a method, color test charts 50, as indicated in FIG. 4 of the drawings, are used as test data. A standard color test chart 50 typically comprises a number of color patches 50.1.1, 50.1.2, 50.1.y, ..., 50.x.1, ..., 50.x.y. The correct color values for the patches on the test chart 50 are known. The color image capturing device can then be calibrated as follows:

Firstly, as can best be seen in FIG. 3 of the drawings, the test chart 50 is imaged through the image capturing device 52 as indicated by arrow F, while the gamma, the gain and the offset, and the color correction steps in the image capturing device 52 are disabled. An automatic color correction parameter determination system 54 compares a set of measured output values, indicated by arrow G, with the known values of the color chart 50, as indicated by arrow H, to determine a gamma response curve γ( ) as indicated by arrow I.

The gamma response thus determined is then enabled at 52. The test chart 50 is then imaged again. A new set of measured output values G is then used to determine the channel gain and the offset parameters $\lambda_r$, $\rho_r$, $\lambda_g$, $\rho_g$, $\lambda_b$ and $\rho_b$ at 54 as indicated by arrow I.

The gamma response, the channel gain and the offset parameters are then enabled at 52. A new set of measured output values G is then used to determine the color correction parameters, $a_{i,j}$'s or $d_{i,j}$'s at 54 as indicated by arrow I. In this way all the color compensation parameters can be determined.

To improve accuracy, the measured value of each color patch at each stage of the procedure is typically obtained by sampling pixels within the color patch in the captured image. Accordingly, an average measured sample value of a selected region within each color patch can be computed by:

$$r_i^e = \underset{P_i}{\mathrm{avg}}(r'_{m,n}) \qquad (4)$$
$$g_i^e = \underset{P_i}{\mathrm{avg}}(g'_{m,n})$$
$$b_i^e = \underset{P_i}{\mathrm{avg}}(b'_{m,n})$$

where $P_i$ represents the selected region within the $i^{th}$ color patch.

After such a calibration procedure has been performed, the set of measured color patch values and its corresponding set of known color patch values form a pair that define an input-output characteristic of the color correction system. Accordingly, if the color correction system receives a pixel value during actual image capture that is equal to one of the known color patch values, then the color correction system should produce the corresponding true output color value as output.

The determination of the gamma response curve will now be described in greater detail. To determine the gamma response curve, a sequence of gray color patches at various gray level values can be used. Initially, the gain parameters $\lambda_r$, $\lambda_g$ and $\lambda_b$ are typically set to one and the offset parameters $\rho_r$, $\rho_g$ and $\rho_b$ are typically set to zero. The input intensity of the device may be set up so that the response of the image sensor to an input white patch is just below saturation. The relationship between the known RGB values of the input gray patches and the measured gray level values ($r'_{m,n}$, $g'_{m,n}$, $b'_{m,n}$) then gives the transfer characteristics of the sensor. The average measured sample value over a selected region within each color patch is typically determined by equation (4) above, for example. The gamma response curve $\gamma(\ )$ may be the inverse characteristics of the mapping in the sensor, namely, the gamma curve maps the measured values ($r^e_i$, $g^e_i$, $b^e_i$) to the known RGB values of the gray patches.

The next step in the color calibration process is to determine the color channel gains and offsets. The purpose of this step is to compensate for the color distortion caused by the type of lighting condition in the scene. For example, if the imaging system is used under incandescent lighting, the color of the light will cause a white patch to appear yellowish. To produce accurate output color in the imaging system, this should be corrected. Accordingly, the color calibration process should be performed under different types of lighting conditions so as to provide color compensation parameter sets for different lighting conditions.

The color channel gains and offsets are then determined by reducing the differences between the three color channels when measured over gray colored patches. Two relative gain parameters are defined as follows:

$$\mu_g = \frac{\lambda_g}{\lambda_r} \text{ and } \mu_b = \frac{\lambda_b}{\lambda_r}.$$

A cost function is then defined as follows:

$$D = \sum_i [(r^e_i - \mu_g g^e_i)^2 + (r^e_i - \mu_b b^e_i)^2 + (\mu_g g^e_i - \mu_b b^e_i)^2]$$

where $r^e_i$, $g^e_i$ and $b^e_i$ are measured color values over the $i^{th}$ gray patch. The measured color values are typically averaged as shown in equation (4) over a selected area of each gray patch to reduce measurement noise. The optimum relative gain parameters $\mu_g$ and $\mu_b$ can then be found by minimizing D. As an example, one method to minimize D is by setting the partial derivatives of D with respect to $\mu_g$ and $\mu_b$ to zero, which gives the optimum solution as follows:

$$\mu_g = \frac{2\sum_i (b^e_i)^2 \sum_i r^e_i g^e_i + \sum_i g^e_i b^e_i \sum_i r^e_i b^e_i}{4\sum_i (g^e_i)^2 \sum_i (b^e_i)^2 - \left(\sum_i g^e_i b^e_i\right)^2}$$

$$\mu_b = \frac{2\sum_i (g^e_i)^2 \sum_i r^e_i b^e_i + \sum_i g^e_i b^e_i \sum_i r^e_i g^e_i}{4\sum_i (g^e_i)^2 \sum_i (b^e_i)^2 - \left(\sum_i g^e_i b^e_i\right)^2}$$

From the two relative gain parameters, the channel which has the largest absolute gain value of the three is determined. The absolute gain of the channel which has the largest gain is then set to 1. The absolute gain of the remaining two channels is then determined. Finally, the absolute gains are normalized using the measured and target data. The procedure can be summarized by the following pseudo code, as follows:

```
if (μ_g > 1){
    if (μ_g > μ_b){
        λ_r = 1/μ_g; λ_g = 1; λ_b = μ_b/μ_g;
    }else{
        λ_r = 1/μ_b; λ_g = μ_g/μ_b; λ_b = 1;
    }
}else{
    if (μ_b > 1){
        λ_r = 1/μ_b; λ_g = μ_g/μ_b; λ_b = 1;
    }else{
        λ_r = 1; λ_g = μ_g; λ_b = μ_b;
    }
}
```

$$\kappa = \min\left(\frac{\gamma^{-1}(r'_{white}) - \gamma^{-1}(r'_{black})}{\lambda_r(\tilde{r}_{white} - \tilde{r}_{black})}, \frac{\gamma^{-1}(g'_{white}) - \gamma^{-1}(g'_{black})}{\lambda_g(\tilde{g}_{white} - \tilde{g}_{black})}, \frac{\gamma^{-1}(b'_{white}) - \gamma^{-1}(b'_{black})}{\lambda_g(\tilde{b}_{white} - \tilde{b}_{black})}\right);$$

$$\lambda_r = \kappa\lambda_r; \lambda_g = \kappa\lambda_g; \lambda_b = \kappa\lambda_b;$$

$$\varepsilon = \text{avg}(\gamma^{-1}(r'_{black}), \gamma^{-1}(g'_{black}), \gamma^{-1}(b'_{black}));$$

$$\rho_r = \varepsilon - \lambda_r\tilde{r}_{black}; \rho_g = \varepsilon - \lambda_g\tilde{g}_{black}; \rho_b = \varepsilon - \lambda_b\tilde{b}_{black};$$

The determination of the color compensation parameters will now be described in greater detail.

Equation (2) or (3), depending on which one is used, can be solved for the coefficients so as to determine the optimum color correction parameters. Equations (2) and (3) have very similar structures and they can typically be solved in a similar manner. As an example, consider a solution for the equation (2). Suppose there are N color patches in the color test chart of FIG. 4, so that equation (2) is applicable to the color values corresponding to all N patches. The mapping can then be as follows:

$$\begin{pmatrix} r^e_0 & g^e_0 & b^e_0 \\ r^e_1 & g^e_1 & b^e_1 \\ \vdots & & \vdots \\ r^e_{N-1} & g^e_{N-1} & b^e_{N-1} \end{pmatrix} \begin{pmatrix} a_{0,0} \\ a_{0,1} \\ a_{0,2} \end{pmatrix} = \begin{pmatrix} r^t_0 \\ r^t_1 \\ \vdots \\ r^t_{N-1} \end{pmatrix} \quad (5)$$

$$\begin{pmatrix} r^e_0 & g^e_0 & b^e_0 \\ r^e_1 & g^e_1 & b^e_1 \\ \vdots & & \vdots \\ r^e_{N-1} & g^e_{N-1} & b^e_{N-1} \end{pmatrix} \begin{pmatrix} a_{1,0} \\ a_{1,1} \\ a_{1,2} \end{pmatrix} = \begin{pmatrix} g^t_0 \\ g^t_1 \\ \vdots \\ g^t_{N-1} \end{pmatrix} \quad (6)$$

$$\begin{pmatrix} r^e_0 & g^e_0 & b^e_0 \\ r^e_1 & g^e_1 & b^e_1 \\ \vdots & & \vdots \\ r^e_{N-1} & g^e_{N-1} & b^e_{N-1} \end{pmatrix} \begin{pmatrix} a_{2,0} \\ a_{2,1} \\ a_{2,2} \end{pmatrix} = \begin{pmatrix} b^t_0 \\ b^t_1 \\ \vdots \\ b^t_{N-1} \end{pmatrix} \quad (7)$$

where ($r^t_i$, $g^t_i$, $b^t_i$) represent the true color values for the $i^{th}$ color patch and ($r^e_i$, $g^e_i$, $b^e_i$) represent the average measured color values for the $i^{th}$ color patch as in equation (4). An aim in the color correction system is to find the color correction parameters $a_{0,0}, a_{0,1}, \ldots a_{2,2}$ such that (5)-(7) can be satisfied.

Let A be the N by 3 matrix, given by:

$$A = \begin{pmatrix} r_0^e & g_0^e & b_0^e \\ r_1^e & g_1^e & b_1^e \\ \vdots & & \vdots \\ r_{N-1}^e & g_{N-1}^e & b_{N-1}^e \end{pmatrix}. \quad (8)$$

Preferably, in order to solve A for the values of $a_{0,0}$, $a_{0,1}, \ldots a_{2,2}$, the total number of color patches N should not be less than 3. Equations (5)-(7) can be solved for any value of N larger than, or equal to, 3 using, for example, a least square fit. However, it is desirable that N is larger than 3. In such a case, each matrix equation is an over-determined set of linear equations, from which a least square solution can be found. The cost of finding the solution increases with N. Since the solution is computed off-line (i.e. not during real image capture), hence the size of N does not cause a burden regarding the functioning of the color correction system.

All three equations (5)-(7) can be solved by finding a pseudo inverse of A in equation (8). Since all three equations (5)-(7) have the same A matrix on the left hand side, the typically most computationally intensive portion of the solution, that of finding a pseudo inverse, will only have to be performed once.

To find a least square solution to a system of over-determined linear equations, a method based on the Singular Value Decomposition (SVD) of matrices can be used. Specifically, the SVD of the N by 3 matrix A (with N≧3) is given by:

$$A = U\Sigma V^T$$

where U is an N by 3 orthogonal matrix, V is a 3 by 3 orthogonal matrix, T represents matrix transpose, and $\Sigma$ is a 3×3 diagonal matrix given by:

$$\Sigma = \begin{bmatrix} s_0 & 0 & 0 \\ 0 & s_1 & 0 \\ 0 & 0 & s_2 \end{bmatrix}$$

where $s_i$'s are the singular values of A.

The pseudo inverse of A is:

$$A^{-1} = V\Sigma^{-1} U^T$$

where $\Sigma^{-1}$ is a diagonal matrix given by:

$$\Sigma^{-1} = \begin{bmatrix} inv(s_0) & 0 & 0 \\ 0 & inv(s_1) & 0 \\ 0 & 0 & inv(s_2) \end{bmatrix}$$

where $$inv(\alpha) = \begin{cases} 1/\alpha & \text{if } |\alpha| > \varepsilon \\ 0 & \text{otherwise} \end{cases}$$

for some pre-determined small value $\varepsilon$. As an example, the value $\varepsilon = 10^{-6}$ can be used.

Using the SVD, the optimum color correction coefficients can be found by:

$$\begin{bmatrix} a_{0,0} \\ a_{0,1} \\ a_{0,2} \end{bmatrix} = V\Sigma^{-1} U^T \begin{pmatrix} r_0^t \\ r_1^t \\ \vdots \\ r_{N-1}^t \end{pmatrix} \quad (9)$$

$$\begin{bmatrix} a_{1,0} \\ a_{1,1} \\ a_{1,2} \end{bmatrix} = V\Sigma^{-1} U^T \begin{pmatrix} g_0^t \\ g_1^t \\ \vdots \\ g_{N-1}^t \end{pmatrix} \quad (10)$$

$$\begin{bmatrix} a_{2,0} \\ a_{2,1} \\ a_{2,2} \end{bmatrix} = V\Sigma^{-1} U^T \begin{pmatrix} b_0^t \\ b_1^t \\ \vdots \\ b_{N-1}^t \end{pmatrix} \quad (11)$$

There are a number of reasons why Singular Value Decomposition can be a preferred way of solving (5)-(7) in the color correction system. Firstly, SVD is relatively effective in compacting the "energy" of matrices into a set of orthogonal components. In other words, SVD provides a relatively efficient decomposition of any given matrix into its main components. When the color correction system finds the pseudo inverse using SVD, the major modes in the A matrix are captured as given by the data points. This implies robustness in the solution.

Secondly, SVD always exists for any matrix of any size. As a result, it is normally not necessary to constrain the nature of the N data points. This does not necessarily imply that the "richness" of the color patches is unimportant. It is typically still necessary to use a color test chart so that the color patches span a large portion of the entire color gamut. Even if the color correction system results in a set of measured data forming a sub-space of less than 9 dimensions, the SVD method could still find a solution that adequately captures the characteristics of the data.

Thirdly, SVD can typically be computed relatively efficiently and the solution is robust. Once the SVD is computed, the optimum color correction coefficients for the given sensor and lighting condition can be determined using equations (9)-(11). These values can then be used during capture in (2) to obtain accurate color image data.

If equation (3) is used instead, the optimum solution for the color coefficients $d_{i,j}$ can be solved in a similar fashion using SVD. In such a case, equations (5)-(7) should be modified to $$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix}$$

$$\begin{pmatrix} d_{0,0} \\ d_{0,1} \\ \vdots \\ d_{0,K-1} \end{pmatrix} = \begin{pmatrix} r_0^t - r_0^e \\ r_1^t - r_1^e \\ \vdots \\ r_{N-1}^t - r_{N-1}^e \end{pmatrix}$$

-continued $$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix}$$

$$\begin{pmatrix} d_{1,0} \\ d_{1,1} \\ \vdots \\ d_{1,K-1} \end{pmatrix} = \begin{pmatrix} g_0^t - g_0^e \\ g_1^t - g_1^e \\ \vdots \\ g_{N-1}^t - g_{N-1}^e \end{pmatrix}$$

$$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix}$$

$$\begin{pmatrix} d_{2,0} \\ d_{2,1} \\ \vdots \\ d_{2,K-1} \end{pmatrix} = \begin{pmatrix} b_0^t - b_0^e \\ b_1^t - b_1^e \\ \vdots \\ b_{N-1}^t - b_{N-1}^e \end{pmatrix}$$

In such a case, the matrix A for which the SVD needs to be found would be of dimension N×K. Other than that, the solution can be found in a fashion similar to that described above.

Figure 5:
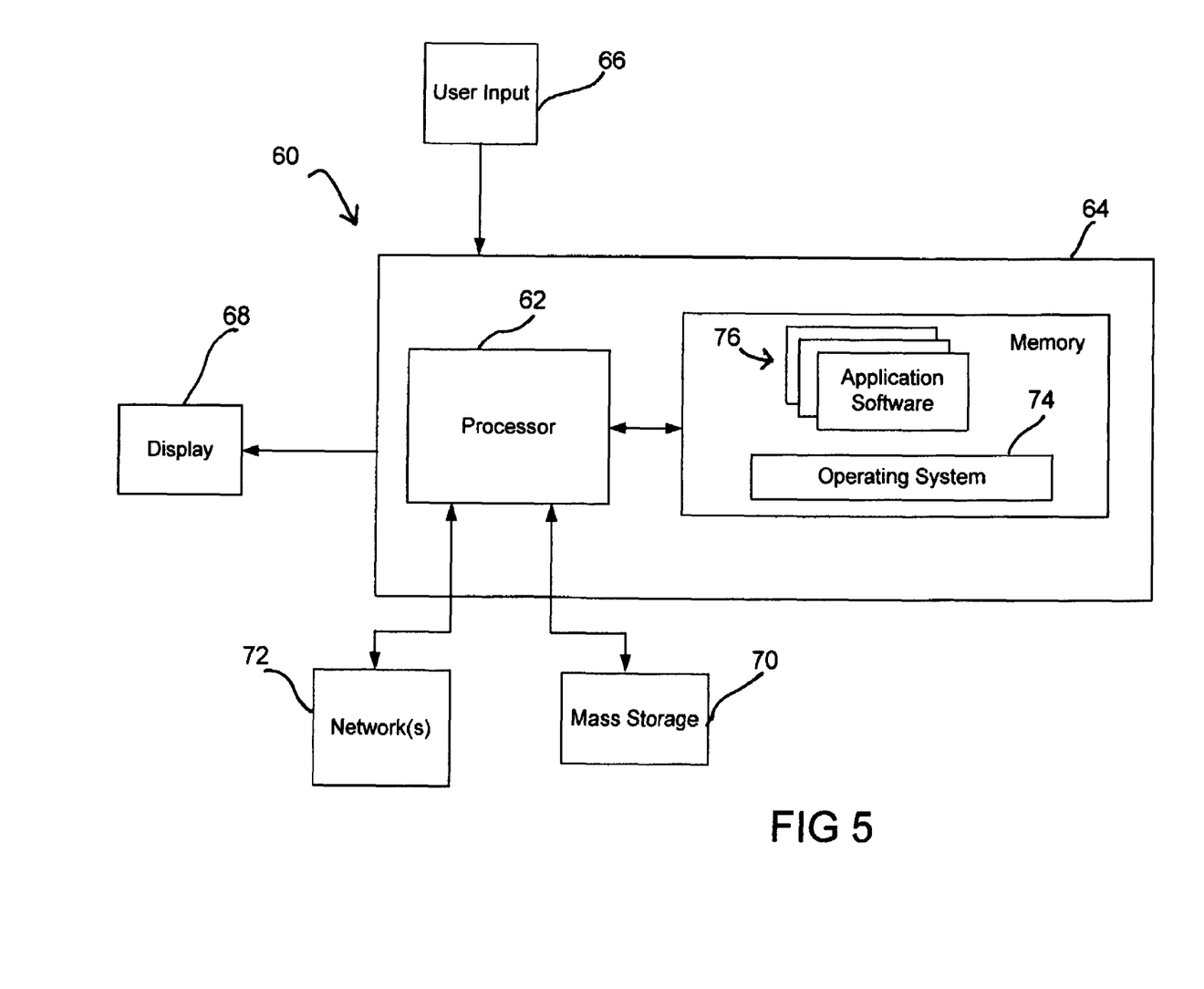
FIG. 5 shows an example of hardware that may be used to implement the embodiments of the invention.

Referring to FIG. 5 of the drawings, an example of hardware 60 that may be used to implement the color calibration methods, in accordance with one embodiment of the invention. The hardware 60 typically includes at least one processor 62 coupled to a memory 64. The processor 62 may represent one or more processors (e.g., microprocessors), and the memory 64 may represent random access memory (RAM) devices comprising a main storage of the hardware 60, as well as any supplemental levels of memory e.g., cache memories, non-volatile or back-up memories (e.g. programmable or flash memories), read-only memories, etc. In addition, the memory 64 may be considered to include memory storage physically located elsewhere in the hardware 60, e.g. any cache memory in the processor 62, as well as any storage capacity used as a virtual memory, e.g., as stored on a mass storage device 70.

The hardware 60 also typically receives a number of inputs and outputs for communicating information externally. For interface with a user or operator, the hardware 60 may include one or more user input devices 66 (e.g., a keyboard, a mouse, etc.) and a display 68 (e.g., a Cathode Ray Tube (CRT) monitor, a Liquid Crystal Display (LCD) panel).

For additional storage, the hardware 60 may also include one or more mass storage devices 70, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 60 may include an interface with one or more networks 62 (e.g., a local area network (LAN), a wide area network (WAN), a wireless network, and/or the Internet among others) to permit the communication of information with other computers coupled to the networks. It should be appreciated that the hardware 60 typically includes suitable analog and/or digital interfaces between the processor 62 and each of the components 64, 66, 68 and 72 as is well known in the art.

The hardware 60 operates under the control of an operating system 74, and executes various computer software applications, components, programs, objects, modules, etc. e.g. a program or module 76 which performs operations described above. Moreover, various applications, components, programs, objects, etc. may also execute on one or more processors in another computer coupled to the hardware 60 via a network 72, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.

What is claimed is:

1. A method, comprising:
   (a) disabling a gamma correction function, a gain correction function, an offset correction function, and a color correction function for a sensor;
   (b) capturing a first image of a color test chart with the sensor, wherein a pixel value corresponding to each color patch of the color test chart is known
   (c) determining a first measured pixel value for each color patch in the first image;
   (d) determining gamma correction parameters for the sensor based on differences between each first measured pixel value for a color patch and the known pixel value for that color patch;
   (e) enabling the gamma correction function for the sensor using the gamma correction parameters determined in step (d);
   (f) with the gamma correction function enabled, capturing a second image of the color test chart with the sensor, and determining a second measured pixel value for each color patch in the second image;
   (g) determining gain and offset parameters for the gain and offset corrections, respectively based on differences between each second measured pixel value for a color patch and the known pixel value for that color patch;
   (h) enabling the gain correction function and the offset correction function for the sensor, wherein for the gain correction function the channel gain parameters determined in step (g) are used, and for the offset correction function the offset parameters determined in step (g) are used;
   (i) capturing a third image of the color test chart with the sensor and with the gamma correction function, the gain correction function, and the offset correction function enabled;
   (j) determining a third measured pixel value for each color patch in the third image; and
   (k) determining color correction parameters for the color correction function based on differences between each third measured pixel value for a color patch and the known pixel value for that color patch.

2. The method of claim 1, wherein the sensor is of a particular sensor design, and steps (a) to (k) are performed for each sensor design.

3. The method of claim 2, further comprising provisioning sensors of the sensor design with the gamma correction parameters, the gain correction parameters, the offset correction parameters, and the color correction parameters.

4. The method of claim 1, wherein determining the first, second, and third measured pixel values for each color patch comprises averaging measured pixel values for a group of pixels representing the color patch.

5. The method of claim 1, wherein determining the gain and offset parameters for the gain and offset correction functions comprises determining the gain and offset parameters that satisfy a constraint that deviations between corrected values of the color channels of the sensor for the gray color patches are kept to a minimum.

6. The method of claim 5, wherein determining the gain and offset parameters that satisfy the constraint comprises minimizing a cost function D defined as $$D = \sum_i \left[ (r_i^e - \mu_g g_i^e)^2 + (r_i^e - \mu_b b_i^e)^2 + (\mu_g g_i^e - \mu_b b_i^e)^2 \right]$$

where $r_i^e$, $g_i^e$ and $b_i^e$ are measured color values over the $i^{th}$ color patch, $\lambda_r$, $\lambda_g$ and $\lambda_b$ are the gain parameters for the red, green, and blue color channels, respectively, and $$\mu_g = \frac{\lambda_g}{\lambda_r}, \text{ and } \mu_b = \frac{\lambda_b}{\lambda_r}.$$

7. The method of claim 1, wherein determining the color correction parameters for the color correction function comprises finding coefficients $a_{0,0}$, $a_{0,1}$, ... $a_{2,2}$ such that $$\begin{pmatrix} r_0^e & g_0^e & b_0^e \\ r_1^e & g_1^e & b_1^e \\ \vdots & & \vdots \\ r_{N-1}^e & g_{N-1}^e & b_{N-1}^e \end{pmatrix} \begin{pmatrix} a_{0,0} \\ a_{0,1} \\ a_{0,2} \end{pmatrix} = \begin{pmatrix} r_0^t \\ r_1^t \\ \vdots \\ r_{N-1}^t \end{pmatrix}$$

$$\begin{pmatrix} r_0^e & g_0^e & b_0^e \\ r_1^e & g_1^e & b_1^e \\ \vdots & & \vdots \\ r_{N-1}^e & g_{N-1}^e & b_{N-1}^e \end{pmatrix} \begin{pmatrix} a_{1,0} \\ a_{1,1} \\ a_{1,2} \end{pmatrix} = \begin{pmatrix} g_0^t \\ g_1^t \\ \vdots \\ g_{N-1}^t \end{pmatrix}$$

$$\begin{pmatrix} r_0^e & g_0^e & b_0^e \\ r_1^e & g_1^e & b_1^e \\ \vdots & & \vdots \\ r_{N-1}^e & g_{N-1}^e & b_{N-1}^e \end{pmatrix} \begin{pmatrix} a_{2,0} \\ a_{2,1} \\ a_{2,2} \end{pmatrix} = \begin{pmatrix} b_0^t \\ b_1^t \\ \vdots \\ b_{N-1}^t \end{pmatrix}$$

are solved in the least square sense, where $(r_i^t, g_i^t, b_i^t)$ represents true color values for the $i^{th}$ color patch, and $(r_i^e, g_i^e, b_i^e)$ represents an average measured color values for the $i^{th}$ color patch.

8. The method of claim 7, wherein the coefficients $a_{0,0}$, $a_{0,1}$, ... $a_{2,2}$ are found using a numerical technique known as the singular value decomposition (SVD).

9. The method of claim 1, wherein determining the color correction parameters for the color correction function comprises finding coefficients $d_{i,j}$ such that $$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix} \begin{pmatrix} d_{0,0} \\ d_{0,1} \\ \vdots \\ d_{0,K-1} \end{pmatrix} = \begin{pmatrix} r_0^t - r_0^e \\ r_1^t - r_1^e \\ \vdots \\ r_{N-1}^t - r_{N-1}^e \end{pmatrix}$$

$$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix} \begin{pmatrix} d_{1,0} \\ d_{1,1} \\ \vdots \\ d_{1,K-1} \end{pmatrix} = \begin{pmatrix} g_0^t - g_0^e \\ g_1^t - g_1^e \\ \vdots \\ g_{N-1}^t - g_{N-1}^e \end{pmatrix}$$

$$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix} \begin{pmatrix} d_{2,0} \\ d_{2,1} \\ \vdots \\ d_{2,K-1} \end{pmatrix} = \begin{pmatrix} b_0^t - b_0^e \\ b_1^t - b_1^e \\ \vdots \\ b_{N-1}^t - b_{N-1}^e \end{pmatrix}$$

are solved in the least square sense, where $(r_i^t, g_i^t, b_i^t)$ represents true color values for the $i^{th}$ color patch, and $(r_i^e, g_i^e, b_i^e)$ represents an average measured color values for the $i^{th}$ color patch, and where where $f_i(\ )$'s are some arbitrary functions of the RGB values at pixel location (m, n).

10. The method of claim 9, wherein the coefficients $d_{i,j}$ are found using a numerical technique known as the singular value decomposition (SVD).

11. A computer-readable medium having stored thereon, a sequence of instructions which when executed by a processor, cause the processor to perform a method comprising:

(a) disabling a gamma correction function, a gain correction function, an offset correction function, and a color correction function for a sensor;

(b) capturing a first image of a color test chart with the sensor, wherein a pixel value corresponding to each color patch of the color test chart is known;

(c) determining a first measured pixel value for each color patch in the first image;

(d) determining gamma correction parameters for the sensor based on differences between each first measured pixel value for a color patch and the known pixel value for that color patch;

(e) enabling the gamma correction function for the sensor using the gamma correction parameters determined in step (d);

(f) with the gamma correction function enabled, capturing a second image of the color test chart with the sensor, and determining a second measured pixel value for each color patch in the second image;

(g) determining gain and offset parameters for the gain and offset corrections, respectively based on differences between each second measured pixel value for a color patch and the known pixel value for that color patch;

(h) enabling the gain correction function and the offset correction function for the sensor, wherein for the gain correction function the channel gain parameters determined in step (g) are used, and for the offset correction function the offset parameters determined in step (g) are used;

(i) capturing a third image of the color test chart with the sensor and with the gamma correction function, the gain correction function, and the offset correction function enabled;

(j) determining a third measured pixel value for each color patch in the third image; and (k) determining color correction parameters for the color correction function based on differences between each third measured pixel value for a color patch and the known pixel value for that color patch.

12. The computer-readable medium of claim 11, wherein determining the first, second, and third measured pixel values for each color patch comprises averaging measured pixel values for a group of pixels representing the color patch.

13. The computer-readable medium of claim 11, wherein determining the gain and offset parameters for the gain and offset correction functions comprises determining the gain and offset parameters that satisfy a constraint that deviations between corrected values of the color channels of the sensor for the gray color patches are kept to a minimum.

14. The computer-readable medium of claim 13, wherein determining the gain and offset parameters that satisfy the constraint comprises minimizing a cost function D defined as $$D = \sum_i [(r_i^e - \mu_g g_i^e)^2 + (r_i^e - \mu_b b_i^e)^2 + (\mu_g g_i^e - \mu_b b_i^e)^2]$$

where $r_i^e$, $g_i^e$ and $b_i^e$ are measured color values over the $i^{th}$ color patch, $\lambda_r$, $\lambda_g$ and $\lambda_b$ are the gain parameters for the red, green, and blue color channels, respectively, and $$\mu_g = \frac{\lambda_g}{\lambda_r}, \text{ and } \mu_b = \frac{\lambda_b}{\lambda_r}.$$

15. The computer-readable medium of claim 11, wherein determining the color correction parameters for the color correction function comprises finding coefficients $a_{0,0}$, $a_{0,1}$, ... $a_{2,2}$ such that $$\begin{pmatrix} r_0^e & g_0^e & b_0^e \\ r_1^e & g_1^e & b_1^e \\ \vdots & \vdots & \vdots \\ r_{N-1}^e & g_{N-1}^e & b_{N-1}^e \end{pmatrix} \begin{pmatrix} a_{0,0} \\ a_{0,1} \\ a_{0,2} \end{pmatrix} = \begin{pmatrix} r_0^t \\ r_1^t \\ \vdots \\ r_{N-1}^t \end{pmatrix}$$

$$\begin{pmatrix} r_0^e & g_0^e & b_0^e \\ r_1^e & g_1^e & b_1^e \\ \vdots & \vdots & \vdots \\ r_{N-1}^e & g_{N-1}^e & b_{N-1}^e \end{pmatrix} \begin{pmatrix} a_{1,0} \\ a_{1,1} \\ a_{1,2} \end{pmatrix} = \begin{pmatrix} g_0^t \\ g_1^t \\ \vdots \\ g_{N-1}^t \end{pmatrix}$$

$$\begin{pmatrix} r_0^e & g_0^e & b_0^e \\ r_1^e & g_1^e & b_1^e \\ \vdots & \vdots & \vdots \\ r_{N-1}^e & g_{N-1}^e & b_{N-1}^e \end{pmatrix} \begin{pmatrix} a_{2,0} \\ a_{2,1} \\ a_{2,2} \end{pmatrix} = \begin{pmatrix} b_0^t \\ b_1^t \\ \vdots \\ b_{N-1}^t \end{pmatrix}$$

are solved in the least square sense, where $(r_i^t, g_i^t, b_i^t)$ represents true color values for the $i^{th}$ color patch, and $(r_i^e, g_i^e, b_i^e)$ represents an average measured color values for the $i^{th}$ color patch.

16. The computer-readable medium of claim 15, wherein the coefficients $a_{0,0}$, $a_{0,1}$, ... $a_{2,2}$ are found using a numerical technique known as the singular value decomposition (SVD).

17. The computer-readable medium of claim 11, wherein determining the color correction parameters for the color correction function comprises finding coefficients $d_{i,j}$ such that $$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix}$$

$$\begin{pmatrix} d_{0,0} \\ d_{0,1} \\ \vdots \\ d_{0,K-1} \end{pmatrix} = \begin{pmatrix} r_0^t - r_0^e \\ r_1^t - r_1^e \\ \vdots \\ r_{N-1}^t - r_{N-1}^e \end{pmatrix}$$

$$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix}$$

$$\begin{pmatrix} d_{1,0} \\ d_{1,1} \\ \vdots \\ d_{1,K-1} \end{pmatrix} = \begin{pmatrix} g_0^t - g_0^e \\ g_1^t - g_1^e \\ \vdots \\ g_{N-1}^t - g_{N-1}^e \end{pmatrix}$$

$$\begin{pmatrix} f_0(r_0^e, g_0^e, b_0^e) & f_1(r_0^e, g_0^e, b_0^e) & \cdots & f_{K-1}(r_0^e, g_0^e, b_0^e) \\ f_0(r_1^e, g_1^e, b_1^e) & & & \vdots \\ \vdots & & & \vdots \\ f_0(r_{N-1}^e, g_{N-1}^e, b_{N-1}^e) & \cdots & \cdots & f_{K-1}(r_{N-1}^e, g_{N-1}^e, b_{N-1}^e) \end{pmatrix}$$

$$\begin{pmatrix} d_{2,0} \\ d_{2,1} \\ \vdots \\ d_{2,K-1} \end{pmatrix} = \begin{pmatrix} b_0^t - b_0^e \\ b_1^t - b_1^e \\ \vdots \\ b_{N-1}^t - b_{N-1}^e \end{pmatrix}$$

are solved in the least square sense, where $(r_i^t, g_i^t, b_i^t)$ represents true color values for the $i^{th}$ color patch, and $(r_i^e, g_i^e, b_i^e)$ represents an average measured color values for the $i^{th}$ color patch, and where where $f_i(\ )$'s are some arbitrary functions of the RGB values at pixel location (m, n).

18. The computer-readable medium of claim 17, wherein the coefficients $d_{i,j}$ are found using a numerical technique known as the singular value decomposition (SVD).

19. A system, comprising:

a processor; and a memory coupled to the processor, the memory storing instructions which when executed by the processor, cause the processor to perform a method comprising:

(a) disabling a gamma correction function, a gain correction function, an offset correction function, and a color correction function for a sensor;

(b) capturing a first image of a color test chart with the sensor, wherein a pixel value corresponding to each color patch of the color test chart is known;

(c) determining a first measured pixel value for each color patch in the first image;

(d) determining gamma correction parameters for the sensor based on differences between each first measured pixel value for a color patch and the known pixel value for that color patch;

(e) enabling the gamma correction function for the sensor using the gamma correction parameters determined in step (d);

(f) with the gamma correction function enabled, capturing a second image of the color test chart with the sensor, and determining a second measured pixel value for each color patch in the second image;

(g) determining gain and offset parameters for the gain and offset corrections, respectively based on differences between each second measured pixel value for a color patch and the known pixel value for that color patch;

(h) enabling the gain correction function and the offset correction function for the sensor, wherein for the gain correction function the channel gain parameters determined in step (g) are used, and for the offset correction function the offset parameters determined step (g) are used;

(i) capturing a third image of the color test chart with the sensor and with the gamma correction function, the gain correction function, and the offset correction function enabled;

(j) determining a third measured pixel value for each color patch in the third image; and (k) determining color correction parameters for the color correction function based on differences between each third measured pixel value for a color patch and the known pixel value for that color patch.

* * * * *